July 2, 1968
J. T. PORTER II
3,391,027
METHOD FOR PRODUCING ELECTRICAL ENERGY IN
ELECTROCHEMICAL CELL
Filed July 21, 1964
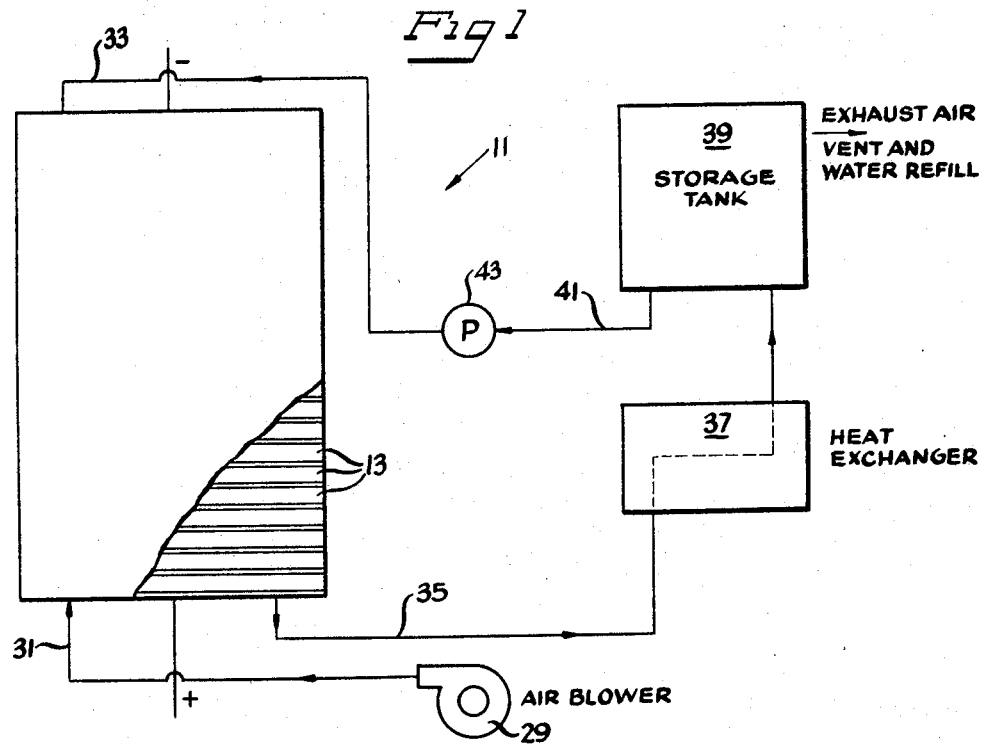
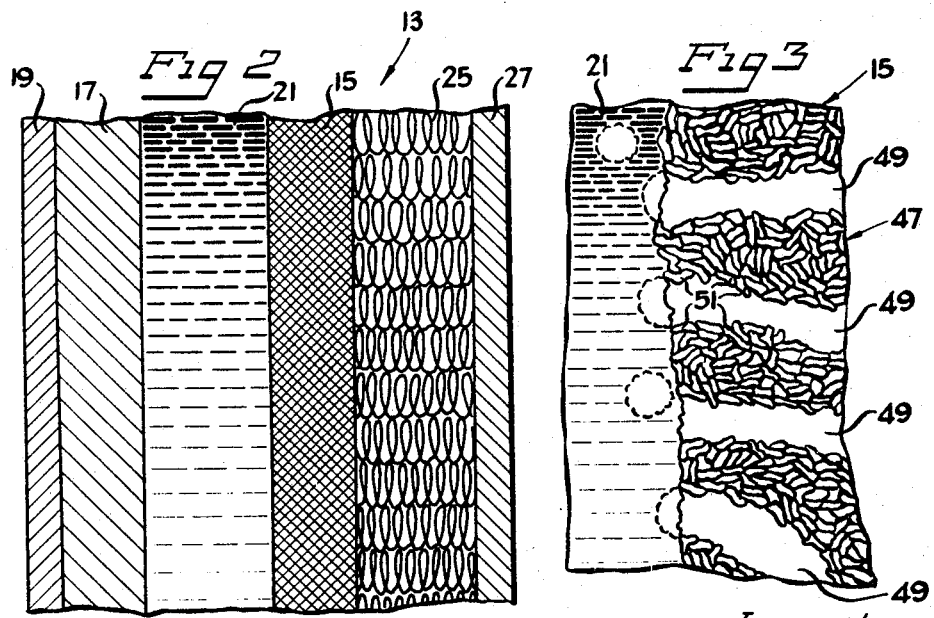
Inventor
John T. Porter II
By Anderson, Luedeka, Fitch, Even & Tabin
Atty's 3,391,027
METHOD FOR PRODUCING ELECTRICAL
ENERGY IN ELECTROCHEMICAL CELL
John T. Porter II, Del Mar, Calif., assignor, by mesne assignments, to Gulf General Atomic Incorporated, San Diego, Calif., a corporation of Delaware
Filed July 21, 1964, Ser. No. 384,132
2 Claims. (Cl. 136—86)

ABSTRACT OF THE DISCLOSURE

A method for producing electrical power by continuously bubbling air through a porous nickel cathode into a liquid electrolyte wherein a zinc anode is disposed. A sintered porous nickel electrode about 0.1 cm. thick having uniformly spaced pores of a size between about 15 and 25 microns when operated at between about 10 and 20 p.s.i.g. produces continuous bubbling whereby all of the nitrogen in the air supplied to the cathode passes through the electrode and into the electrolyte.

---

This invention relates to electrochemical cells and more particularly to the generation of electrical power by an electrochemical process using a gaseous reactant and a liquid electrolyte.

Electrochemical cells such as fuel cells, primary batteries, and secondary batteries, which utilize a gaseous reactant, such as oxygen, in producing electrical energy have been used for some time.

For example, primary batteries using caustic electrolyte have been manufactured which employ consumable zinc anodes and porous carbon cathodes in connection with a supply of air. These batteries have been of the "low drain" type, suitable only for the production of a fairly low amperage electric current over a long period of time. As such, they have proved suitable for the supply of electrical power to railway signal lights and the like, in which only a low steady current is required. However, such batteries have not eben considered suitable for "high drain" applications.

Primary batteries of the type described above utilize relatively thick, porous carbon electrodes which permit air to diffuse therethrough so that the oxygen in the air can react at the interface between the solid electrode, the liquid electrolyte and the air. The diluent, primarily nitrogen, is removed by back-diffusion through the electrode, driven by concentration gradients. Removal of the diluent has proved to be an inherent limitation to the rate at which the electrochemical reaction may be carried on.

When a porous electrode is operated with a mixture of a reactant gas and a diluent gas, under conditions of high density current generation, gas phase concentration polarization becomes more of a factor with which to be reckoned. When operating conditions are such that a large percentage of the reactant gas in the gas mixture is being used, the gas in the interfacial area where the reaction proceeds is composed of a very large percentage of diluent. Accordingly, the voltage losses due to relative unavailability of the reactant gas, termed gas phase polarization, increase significantly with the instantaneous depletion of the reactant gas concentration, thus reducing the electrical power output of the cell.

The size of the electrochemical cells is also important because it is desirable to place a large number of cells in a relatively small volume to provide a compact unit that has a high power output. Accordingly, it is important that it be possible to make use of electrodes which are fairly thin to accomplish these objectives. Electrochemical cells of this general type which produce high amounts of electrical power when operated on a mixture of a reactant gas and a diluent gas are desired.

It is the principal object of the present invention to provide an improved method for producing electrical power in an electrochemical cell utilizing a gaseous reactant and a liquid electrolyte and to provide apparatus for carrying out this method. It is another object to provide an improved electrode for the generation of high density electric current in an electrochemical cell of the above type. It is a further object to provide an improved porous cathode for use with air in an electrochemical cell including a solid metallic consumable anode and a liquid electrolyte and to provide a method for operating the cell to efficiently provide high density electrical current. These and other objects of the invention are more particularly set forth in the following detailed description and in the accompanying drawings wherein:

FIGURE 1 is a diagrammatic view of a secondary battery embodying various features of the present invention;

FIGURE 2 is an enlarged fragmentary sectional view of one of the cells of the battery shown in FIGURE 1; and FIGURE 3 is a diagrammatic fragmentary cross-sectional view of one of the electrodes illustrated in FIGURE 2 and the adjacent electrolyte area.

In general, the invention provides a method for the production of electrical power by electrochemical action utilizing a porous metal electrode that is disposed in contact with a liquid electrolyte in an electrochemical cell. The porous metal electrode contains a plurality of pores of a predetermined minimum size which extend through the electrode between a front surface in contact with the electrolyte and a rear surface thereof. Electrochemical action is promoted by applying a gaseous mixture of a reactant gas and a diluent gas to the rear surface under sufficient pressure to cause the gaseous mixture to pass through the pores of the electrode and bubble into the liquid electrolyte.

Because the pores are distributed uniformly across the entire electrode, bubbling occurs uniformly from every section of the front surface of the electrode. As the gaseous mixture passes through the pores, the reactant gas is distributed throughout the interstices of the entire electrode where the reaction proceeds at or near the triple interface between the solid electrode, the liquid electrolyte, and the gas. All of the inert diluent gas is passed completely through the electrode and is bubbled into the liquid electrolyte. This method efficiently removes the diluent gas from the reaction area, keeping gas phase concentration polarization at an acceptably low level even though a high density electric current is drawn from the electrochemical cell.

For purposes of illustration, the invention is shown and described in conjunction with a secondary battery 11 in which the cathode is operated on a supply of air and which incorporates a circulating electrolyte system. The specific secondary battery 11 is more fully described in pending U.S. patent application Ser. No. 259,016, filed Feb. 18, 1963, now abandoned. Although the invention is considered especially well suited for secondary batteries of this type, which operate with an air cathode, it should also be understood that the invention is also considered applicable to other types of electrochemical cells, for example primary batteries and fuel cells, and also to other gaseous mixtures, as for example cracked ammonia.

As shown in FIGURE 1 of the drawing, the secondary battery 11 comprises a plurality of individual electrochemical cells 13 that are clamped together by suitable means (not shown), such as a plate and frame press. Any number of individual cells may be employed, and these cells may be electrically connected in diverse series and parallel combinations to provide the particular electrical power output desired.

As best seen in FIGURE 2, each of the electrochemical cells 13 comprises a porous cathode 15 and a solid metallic anode 17 of zinc. The electrodes 15, 17 are thin, flat plates. The anode 17 is disposed upon a backing plate 19. The cell 13 is filled with a caustic electrolyte 21, such as KOH.

Adjacent the rear surface of the cathode 15 (the right hand surface as viewed in FIGURE 2) is disposed a thin filler bed 25 made from a conductive fibrous material, such as stainless steel wool. The filler bed 25 is secured to a backing plate 27 which serves as one boundary of the cell 13. The backing plate 27 may be made of any material that is chemically nonreactive with the electrolyte, such as nickel. The backing plate 27 may also serve as the backing plate for the anode of the next adjacent cell and, if an electrically conductive plate is used, will connect the cells 13 in series arrangement.

The illustrated cell 13 utilizes a zinc-oxygen electrochemical couple which has theoretical potential of 1.65 volts. The overall chemical operation of the cell 13 is shown by the following chemical equation:

$$Zn + \tfrac{1}{2} O_2 \rightarrow ZnO$$

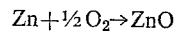

Air is utilized to supply the oxygen required for the electrochemical reaction, providing a readily available source of oxygen that requires no ancillary storage arrangement, as would substantially pure oxygen. Thus, in the battery 11, not only is reactant $O_2$ supplied to the cathode, but along with the reactant comes diluent gas, primarily nitrogen, which makes up over 79 percent by volume of the atmosphere.

Air is fed by a blower 29 which directs it through a suitable conduit 31 into the array of cells 13 where it is distributed to the filler beds 25 of each of the cells. In operation, as the air passes through the porous metal electrode 15 and bubbles into the electrolyte 21 a major portion of the oxygen is consumed in the electrochemical reaction. The unused portion of the oxygen and the inert nitrogen pass into the electrolyte. A closed circuit of electrolyte is used in which the liquid caustic electrolyte 21 is supplied via an inlet 33 to the array of cells 13 whence it passes into each of the cells through a system of parallel passageways. The electrolyte 21 is withdrawn from the cell array through a discharge line 35 which leads to a heat exchanger 37 that lowers the temperature of the electrolyte. From the heat exchanger 37, the electrolyte is fed into an electrolyte storage tank 39, where the unused oxygen and nitrogen are discharged. The electrolyte is withdrawn from the storage tank 39 through line 41 and delivered to the inlet line 33 by a pump 43. Water may be added to the storage tank 39 to make up for any water that may evaporate from the electrolyte 21 during the operation of the battery 11.

The ZnO produced by the electrochemical reaction separates as a suspension in the electrolyte. Continuous circulation of the electrolyte constantly removes the suspended ZnO from the cells, transporting it to the storage tank 39 where it is removed by settling due to reduced flow rate or by filtration through a felted material (not shown) such as nylon, which is resistant to attack by the electrolyte. Constant removal of the ZnO allows the electrochemical reaction to proceed at a desirably high rate and to a greater extent than would be possible if the ZnO were not removed from the cell stack.

The heat exchanger 37 removes waste heat produced in the electrochemical reaction and thus prevents excessive temperature rise.

To recharge the battery 11 after a substantial portion of the consumable zinc anode 17 has been used, electrical current is supplied so that the zinc electrode 17 serves as a cathode and the porous electrode 15 serves as an anode. During the charge cycle, metallic zinc is plated out onto the electrode 17, reducing the concentration of zincate in the circulating electrolyte stream well below its saturation level. Accordingly, the ZnO which has been separated in the storage tank is re-dissolved in the electrolyte during the charge cycle until the zinc electrode 17 is rebuilt.

As best seen in FIGURE 3, the improved cathode 15 comprises a hot-pressed or sintered porous matrix of a metal which is chemically resistant to the caustic electrolyte, preferably nickel. The cathode 15 has gas delivery pores 49 of a predetermined minimum size, above about 10 microns, namely between 15 and 25 microns, and preferably about 20 microns in average size, distributed uniformly across its surface. Of course, the actual gas delivery pores 49 are not as straight as they diagrammatically appear in FIGURE 3. The gas delivery pore size is determinative of the feed gas pressure at which the electrode can be efficiently operated in bubbling condition. The gas delivery pore size is regulated so that feed gas pressures between about 5 and 30 p.s.i.g. may be used, and preferably such that pressures between about 10 to 20 p.s.i.g. are sufficient.

To provide a large area of triple interface between solid, liquid and gas, the matrix 47 is preferably made from particles 51 of metal which are rough and non-uniform in shape and have a high ratio of surface area to unit mass. Such a structure has a myriad of small pores in addition to the gas delivery pores. Metal particles 51 which are formed by the decomposition of a metal carbonyl are preferred. Such particles, because of their chainlike configurations, do not truly have an accurate particle size; however, the equivalent mean particle size is about 3 microns.

Preferably the electrode 15 also includes a catalyst so that the electrochemical reaction will proceed at efficient rates. A catalyst suitable for the catalysis of the contemplated reaction that proceeds at the electrode is, of course, chosen. For the cathode of the zinc-air battery, suitable catalysts include, for example, silver, manganese dioxide, graphite, palladium, platinum, etc.

Any suitable method of forming the porous metal matrix 47 may be used. A porous metal matrix 47 that is suitable for use as a bubbling air electrode 15 for an electrochemical cell using aqueous KOH electrolyte can be hot-pressed from a mixture of carbonyl nickel powder and powdered manganese dioxide. The porosity is controlled by selection of powders having predetermined particle sizes. Hot-pressing a mixture of about 2 parts by weight nickel powder to 1 part manganese dioxide at about 60 p.s.i. and about 350° C. for about 3 minutes provides a suitable electrode 15.

Another method of producing a suitable electrode is more fully described in pending patent application, Ser. No. 410,707 filed Nov. 12, 1964, and assigned to the assignee of this patent application. The electrode 15 produced by this method is shown in FIG. 3. This method generally comprises mixing carbonyl nickel powder 51 with charcoal in a weight ratio of about 15 to 1, nickel to charcoal, and hot-pressing the mixture in a suitable die to provide a flat plate. Hot-pressing at about 2500 p.s.i. and about 600° C. for 3 minutes is sufficient. The hot-pressed plate is subjected to anodic treatment versus a dummy cathode in an aqueous solution of about 10 weight percent KOH for about 12 hours at about 90° C. The anodic treatment removes the charcoal leaving a nickel matrix 47 having the desired porosity.

It has been found that the secondary battery 11 employing cathodes 15 with an average gas delivery pore diameter of about 20 microns and a thickness from about 0.1 cm. to about 0.2 cm. can be efficiently operated by applying air pressure between about 10 p.s.i.g. and about 15 p.s.i.g. to produce uniform bubbling from the entire cathode surface area. The nitrogen and unreacted oxygen are carried from the cell 13 by the electrolyte stream and escape from the electrolyte in the storage tank 39. For efficient operation at high capacity, it is preferred to use from about 70 percent to about 80 percent of the available oxygen in the air which passes through the battery 11.

Using an air pressure of about 15 p.s.i.g. results in a flow rate of air through the battery of about 10 cubic centimeters of air, measured at standard temperature and pressure, per square centimeter of cathode surface, per minute. Depending on the catalyst chosen, a potential from about 1.0 volt to about 1.2 volts per cell 13 is achieved when the battery is operated at an electrolyte temperature of about 65° C. and at current density of about 100 ma./cm.$^2$. Primary batteries utilizing consumable zinc anodes and porous carbon cathodes without bubbling have been unable to produce a current density of 100 ma./cm.$^2$ at a like operating temperature and comparable voltage because significant polarization losses occur. Furthermore, such primary batteries exhibit significant decreases in voltage due to polarization when operated above a current density of about 5 ma./cm.$^2$.

The following examples illustrate the manufacture and operation of electrodes embodying various of the features of the invention. It is to be understood that these examples are merely illustrative and in no way limit the scope of the invention which is defined by the appended claims.

Example I

A porous cathode 15 in plate form, about 0.7 mm. in thickness and about one inch square is produced by mixing carbonyl nickel powder, graphite and charcoal in a ratio of 15 parts, by weight, nickel powder to 2 parts graphite to 2 parts charcoal. The graphite and charcoal are ground in a ball mill for about 3 hours so that the particle size is no greater than about 20 microns. The graphite and charcoal powders are then thoroughly mixed with the nickel powder. About 15 grams of the mixture is placed in a suitable graphite die which is disposed within an induction furnace. The die is flooded with a stream of nitrogen to prevent possible oxidation of the graphite die or the surface of the nickel powder. Pressure is initially applied to cake the mixture and then released. The die is then brought up to about 610° C., and a pressure of 2500 p.s.i. is applied for 3 minutes. The pressed plate is immediately removed from the die and cooled to room temperature.

The plate is immersed in an aqueous solution of 10 percent by weight KOH at 90° C. opposite a dummy cathode. A current of about 3 amps is applied to the plate as an anode for about 12 hours. At the end of this period, the porous nickel matrix 47 is removed from the electrolyte, washed thoroughly with water to remove any residual carbon and then dried. The gas delivery pores 49 have an average diameter about 20 microns.

The porous matrix 47 is assembled as a cathode 15 in an electrochemical cell, spaced about 0.2 cm. from an anode one inch square and 0.1 cm. thick of zinc, having a density of about 4 grams per cm.$^3$. The cell 13 is filled with an aqueous solution of 25 percent by weight KOH, and air pressure about 12 p.s.i.g. is supplied to the cathode 15. The pressure of 12 p.s.i.g. results in a flow rate of about 40 cubic centimeters of air per minute and creates bubbling uniformly from the entire surface of the cathode 15. Sufficient electrolyte circulation is provided so that the electrolyte gas mixture leaving the cell is at least 60 percent electrolyte. The temperature of the electrolyte 15 is regulated so that the discharge temperature from the battery is about 65° C.

The anode 17 and the cathode 15 are externally electrically connected to a variable load. The no load voltage is 1.38 volts. When a current of 0.65 ampere is drawn, equal to about 100 ma./cm.$^2$, the voltage of the cell measures 1.2 volts. Measurements also show that, under these conditions, about 30 percent of the oxygen in the air is being used. Increase in the amount of load to draw a current density of 200 ma./cm.$^2$ decreases the voltage to about 1.0 volt and increases the percent of oxygen used to about 60 percent.

Example II

A porous cathode plate is prepared as in Example I except that 15 parts by weight of nickel to 1 part by weight of charcoal are used with no graphite. The same procedure for removal of carbon is used as is used in Example I.

After the charcoal has been removed the electrode is impregnated with a solution of palladium resinate (containing 9 percent by weight palladium) in trichloroethylene. For a 1 inch square electrode about 65 milligrams of palladium resinate in 65 cubic centimeters of trichloroethylene are used. The impregnation is carried out by saturating the porous plate with the solution, then evaporating the solvent with a stream of warm air, then saturating it again and so on until the solution has all been used.

The porous plate is then placed on a hot plate at about 300° C. for 15 minutes to decompose the organic material in the palladium resinate. This process results in placing a palladium catalyst in the electrode structure that is very beneficial to the operation of the air electrode.

The electrode is tested as in Example I using a zinc anode. Air pressure of about 15 p.s.i.g. is applied and bubbling begins. The no load voltage in the external circuit reads 1.5 volts. Load is applied to draw 0.65 ampere, equal to about 100 ma./cm.$^2$, and the voltage measures 1.25 volts. At 200 ma./cm.$^2$, the voltage measures 1.11 volts.

The cathodes made in Examples I and II are considered excellently suited for operation in a secondary battery 11 of this type which uses a liquid caustic electrolyte and which operates on air. Operation under bubbling conditions efficiently removes the diluent gas from the battery 11 via the circulating electrolyte stream and allows the cathode 15 to be efficiently operated at values of current density previously unfeasible. The electrodes made in Examples I and II can be operated at current densities of 200 ma./cm.$^2$ without encountering non-proportional voltage drops indicative of gas phase polarization.

The invention is considered suitable for, and will provide superior performance in, electrochemical cells utilizing a gaseous feed mixture of a reactant gas and a diluent gas so long as the diluent does not adversely affect the liquid electrolyte, adversely affect the electrochemical reaction, or deteriorate the other electrode. Various modifications and changes may be made in the illustrated structure without departing from the spirit and scope of the present invention.

Various of the features of the invention are set forth in the following claims.

What is claimed is:

1. A method for producing electrical power in an electrochemical cell using a liquid electrolyte, which method comprises disposing a porous nickel electrode about 0.1 cm. thick in the liquid electrolyte so that a surface of said nickel electrode is in contact with the electrolyte, said nickel electrode having a plurality of pores between about 15 and 25 microns in size which extend therethrough into said surface and which are distributed substantially uniformly across said surface, disposing a second electrode in contact with the electrolyte, electrically connecting said electrodes, and continuously applying air at between about 10 and about 20 p.s.i.g. to said nickel electrode so that air passes through said pores and continuously bubbles into the liquid electrolyte whereby oxygen is distributed across the entire surface of said nickel electrode and the electrochemical reaction proceeds at the solid-liquid-gas interface, and whereby all of said nitrogen is removed from said nickel electrolyte by bubbling into the liquid electrolyte.

2. A method in accordance with claim 1 wherein, when air is continuously applied at about 15 p.s.i.g., the flow rate is about 10 cubic centimeters per square centimeter of nominal surface area of said porous nickel electrode.

References Cited

UNITED STATES PATENTS

| | | | |
|---|---|---|---|
| 2,716,670 | 8/1955 | Bacon | 136—86 |
| 2,860,175 | 11/1958 | Justi | 136—86 X |
| 2,901,523 | 8/1959 | Justi et al. | 136—86 |
| 2,921,110 | 1/1960 | Crowley et al. | 136—86 |
| 2,947,797 | 8/1960 | Justi et al. | 136—86 |
| 3,043,898 | 7/1962 | Miller et al. | 136—86 |
| 3,152,015 | 10/1964 | Tirrell | 136—86 |
| 3,160,528 | 12/1964 | Dengler et al. | 136—86 |

ALLEN B. CURTIS, *Primary Examiner.*